(12) United States Patent
Kroeger et al.

(10) Patent No.: US 6,844,842 B2
(45) Date of Patent: Jan. 18, 2005

(54) METHOD FOR PULSE WIDTH MODULATION OF A RADAR SYSTEM

(75) Inventors: Jens Kroeger, Sickte (DE); Ralph Mende, Braunschweig (DE); Karsten Schumann, Braunschweig (DE)

(73) Assignee: Automotive Distance Control Systems GmbH, Lindau (DE)

( * ) Notice: Subject to any disclaimer, the term of this patent is extended or adjusted under 35 U.S.C. 154(b) by 0 days.

(21) Appl. No.: 10/344,871

(22) PCT Filed: Aug. 2, 2001

(86) PCT No.: PCT/EP01/08963

§ 371 (c)(1),
(2), (4) Date: Jun. 16, 2003

(87) PCT Pub. No.: WO02/14902

PCT Pub. Date: Feb. 21, 2002

(65) Prior Publication Data

US 2004/0004567 A1 Jan. 8, 2004

(30) Foreign Application Priority Data

Aug. 16, 2000 (DE) .......................................... 100 39 943

(51) Int. Cl.$^7$ .............................................. G01S 13/93
(52) U.S. Cl. .......................... 342/70; 342/82; 342/109; 342/137; 342/202
(58) Field of Search .......................... 342/70, 82, 109, 342/134, 135, 137, 202

(56) References Cited

U.S. PATENT DOCUMENTS

| | | | | |
|---|---|---|---|---|
| 3,102,263 A | * | 8/1963 | Meyer | 342/113 |
| 3,333,266 A | * | 7/1967 | Kern | 342/127 |
| 3,451,059 A | * | 6/1969 | Page | 342/132 |
| 3,579,238 A | | 5/1971 | Haeff et al. | |
| 3,830,567 A | * | 8/1974 | Riegl | 356/5.05 |
| 4,450,445 A | | 5/1984 | Conner, Jr. et al. | |
| 4,939,523 A | * | 7/1990 | Jehle et al. | 343/705 |
| 4,940,988 A | * | 7/1990 | Taylor, Jr. | 342/93 |
| 5,276,453 A | * | 1/1994 | Heymsfield et al. | 342/112 |
| 5,559,516 A | * | 9/1996 | Didomizio et al. | 342/118 |
| 6,147,638 A | * | 11/2000 | Rohling et al. | 342/109 |
| 6,225,943 B1 | * | 5/2001 | Curley et al. | 342/137 |
| 6,404,381 B1 | * | 6/2002 | Heide et al. | 342/109 |
| 6,429,804 B1 | * | 8/2002 | Kishida et al. | 342/70 |
| 2004/0004567 A1 | * | 1/2004 | Kroeger et al. | 342/109 |

FOREIGN PATENT DOCUMENTS

| | | |
|---|---|---|
| DE | 3736055 | 1/1995 |
| DE | 19754720 | 7/1999 |
| GB | 2281164 | 2/1995 |
| JP | 11023695 | 1/1999 |
| JP | 12171548 | 6/2000 |

* cited by examiner

*Primary Examiner*—John B. Sotomayor
(74) *Attorney, Agent, or Firm*—W. F. Fasse; W. G. Fasse

(57) ABSTRACT

A radar system is operated by controlling and thereby limiting the mean power of the transmitted signal in response to the mean power of the received signal thereby limiting the power to a predetermined power range. Preferably the power control or regulation is performed by varying the pulse repetition frequency and/or the pulse duration of the transmitter pulses. This method is well suited for operating a motor vehicle range warning system.

5 Claims, 2 Drawing Sheets

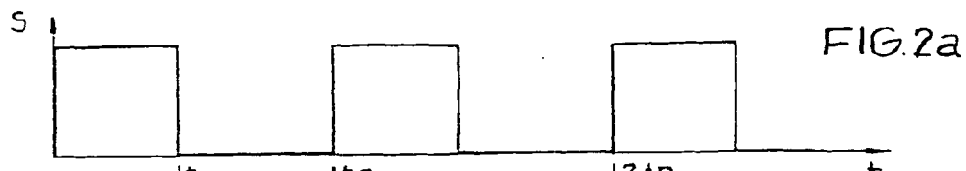
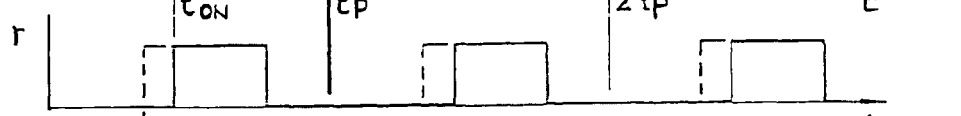
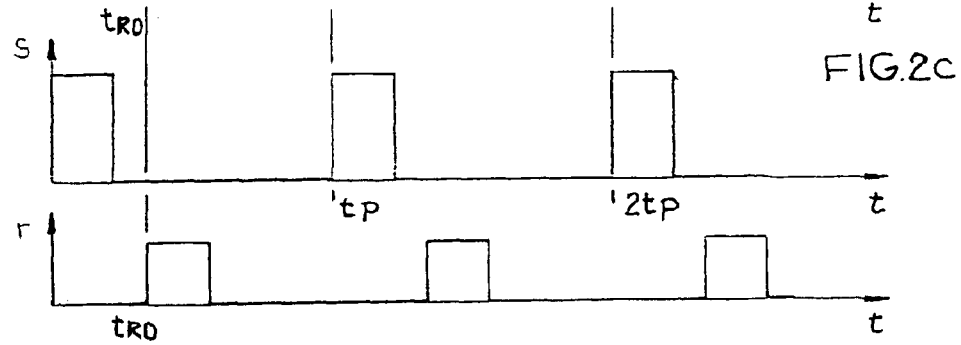
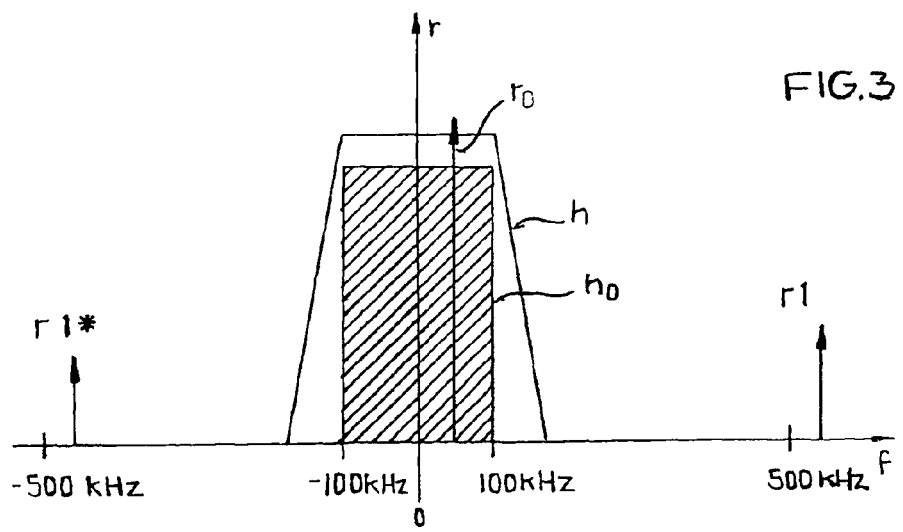

METHOD FOR PULSE WIDTH MODULATION OF A RADAR SYSTEM

FIELD OF THE INVENTION

The invention relates to a method for operating a radar system for acquiring range and speed particularly relative speed, information, regarding an object moving in an observation range.

BACKGROUND INFORMATION

Such a method is known, for example, from DE 197 54 720 A1. The known method enables the simultaneous or separate determination of the range and/or the speed, particularly the relative speed, to one or more reflecting objects present in an observation area. For this purpose it is provided that the radar system is switched several times back and forth for short timed intervals between a transmitting operation and a receiving operation in a plurality of measuring phases of a measuring procedure. Thereby, a pulse shaped transmitted signal is transmitted in each measuring phase of the measuring procedure during the respective transmitting operation of at least one transmitter unit of the radar system. The pulse shaped transmitted signal includes a sequence of transmitter pulses having a defined pulse duration and a determined carrier frequency. The transmitted pulses are emitted at a time interval that is determined by a pulse repetition rate. The transmitted pulses are reflected by the reflection object or objects to the radar system which receives the transmitted and reflected pulses and evaluates them as a received signal.

Hereby it is a disadvantage that the energy reflected by the reflecting object or by the reflecting objects, that is: the mean energy of the received signal, is strongly dependent on the range to the reflecting object or the reflecting objects. Thus, the method has high signal dynamics which unfavorably affect the price of the circuit components required for the signal processing.

SUMMARY OF THE INVENTION

Accordingly, it is the object of the invention to improve the above described method so that it can be performed with cost advantageous components.

The above object has been achieved according to the invention by the combination of the following steps:

a) emitting in a timed sequence transmitter pulses with a pulse repetition frequency (tP$^{-1}$) and with a pulse duration (tON) as a transmitted signal (s) into an observation area, b) receiving reflected pulses from a reflecting object in the observation area, as a received signal (r), c) processing said received signal (r) to produce a control signal representing a received mean power of said received signal (r), d) and varying a transmitting mean power of said transmitted signal (s) in response to said control signal for limiting said received signal (r) to a predetermined power range.

In the method according to the invention for operating a radar system for ascertaining the range to at least one reflecting object that is present in the observation area and/or the speed, particularly the relative speed of the at least one reflecting object, transmitter pulses are emitted in a timed sequence into the observation area as a transmitted signal. The transmitter pulses have a defined pulse duration and a determined pulse repetition frequency. Transmitter pulses of the transmitted signal that are reflected by the at least one reflecting object, are referred to herein as received signals. Further, the mean power of the received signal is ascertained and limited to a predetermined power range by varying the mean power of the transmitted signal in response to the received signal. The mean power of the transmitted signal is preferably varied by varying the pulse repetition rate and/or the pulse duration of the transmitter pulses in response to the mean power of the received signal.

According to an advantageous development of the present method in cases in which the ascertained value of the mean power of the received signal is larger than a predetermined upper power value, the pulse repetition frequency and/or the pulse duration of the transmitter pulses is varied continuously or in steps in response to the received signal. The reducing is preferably performed at a given speed for varying until the thereafter resulting mean power of the received signal is smaller than or equal to the upper predetermined power value.

In cases in which the ascertained value of the mean power of the received signal is smaller than a predetermined lower power value, the pulse repetition frequency and/or the pulse duration of the transmitter pulses is advantageously increased continuously or in steps until the resulting mean power of the received signal is larger than or equal to the lower predetermined power value.

Preferably the transmitter pulses are emitted with a determined carrier frequency which is kept constant during the pulse duration of the respective transmitter pulses. According to an advantageous further development of the present method the carrier frequency is successively varied in at least one measuring phase from transmitter pulse to transmitter pulse.

Furthermore, the range and/or the speed of the at least one reflecting object present in the observation area also referred to as reflection area, is advantageously ascertained by evaluating the frequency difference and/or the phase difference between the transmitted signal and the received signal.

BRIEF DESCRIPTION OF THE DRAWINGS

A motor vehicle range warning system will be described in more detail in the following as an example embodiment of the invention, with reference to the accompanying drawings, wherein:

FIGS. 2a to 2c show time diagrams of the transmitted and received signals; and

FIG. 3 is a schematic illustration of the frequency spectrum of the received signal converted, as to frequency, into the base band.

Figure 1:
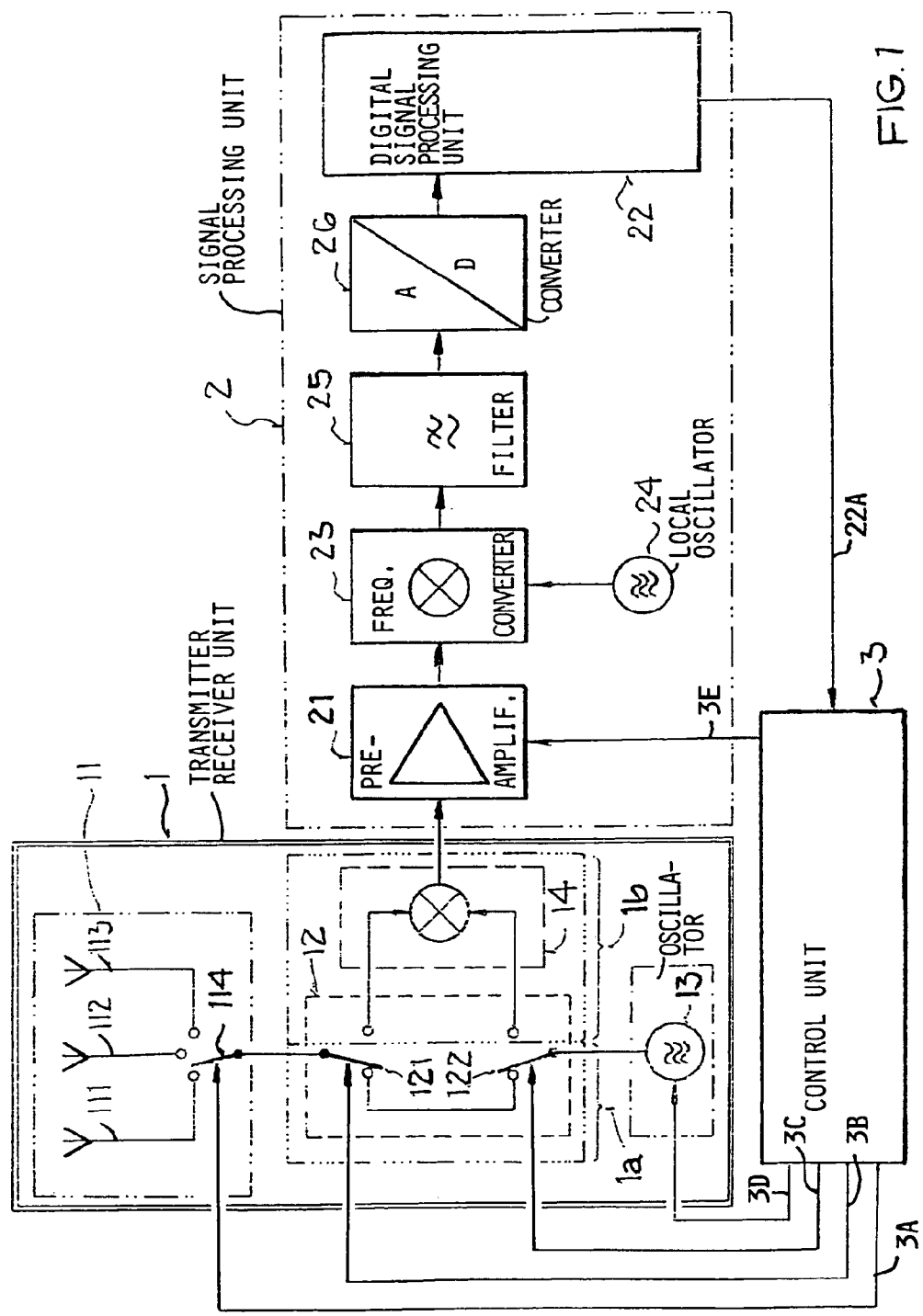
FIG. 1 is a block diagram of the radar system.

DETAILED DESCRIPTION OF A PREFERRED EXAMPLE EMBODIMENT AND OF THE BEST MODE OF THE INVENTION

A radar system working as a motor vehicle range warning system must determine the distance and, if necessary also the speed, particularly the relative speed, of at least one reflecting object, clearly and with a high resolution. As a rule the determination must be made simultaneously for all reflecting objects present in the observation area, that is for vehicles ahead, oncoming vehicles and following vehicles, persons and any other reflecting objects. For example, if the required definite observation range is 150 m, the desired resolution is 1 m and the desired speed resolution is 1 m/s. For this purpose, an antenna emits a transmitted signal with a transmitter frequency of, for example 76 GHz during at least one measuring phase of the measuring procedure. Following passage through the transmission range the antenna detects the reflection signal as an analog received signal, which is received as a result of reflection by the vehicles ahead and following (reflecting objects). Thereby the same antenna is used for the transmitting operation and for the receiving operation. However, different antennas may be provided for sensing different angular ranges at successive measuring operations. The received signal is further processed by a signal processing unit and evaluated with regard to any frequency shift and/or phase shift. Spectral analysis is applied to the result to obtain the range information and, if applicable, the speed information.

According to FIG. 1 the radar system comprises, for this purpose, the following construction

- a transmitter-receiver unit 1 with an antenna unit 11,
- a transmitter section 1a, a receiver section 1b, and an oscillator 13; the unit 1 combines the functions of the transmitter unit and of the receiver unit, the essential components of the unit 1 are compactly combined as a uniform module,
- a signal processing unit 2 including a preamplifier 21 for band width limiting, a digital signal processing unit 22 for example constructed as a digital signal processor, a frequency converter 23, a local oscillator 24, an anti-aliasing filter 25, and an analog to digital converter 26; and
- a control unit 3 which controls the two HF-switches or transmitter receiver switch 121 and the LO-switch 122, the HF-switching unit 12 and the modulation of the oscillator 13. The control unit 3 is controlled by the digital signal processing unit 22 for synchronizing the transmitter-receiver unit 1 and the signal processing unit 2. As further seen in FIG. 1, the digital signal processing unit 22 has a control output connected through a feedback and control conductor bus 22A to an input of the control unit 3. The control unit 3 has five control outputs 3A, 3B, 3C, 3D and 3DE to be described in more detail below.

The antenna unit 11 of the transmitter-receiver unit 1 is provided for emitting the transmitted signal and for detecting the reflected and received signal. The antenna unit comprises several antennas 111, 112, 113 and an antenna switch 114 for selecting the respective antenna 111, or 112, or 113, whereby each of the antennas 111, 112, and 113 is selected for one respective measuring procedure having a respective different angular range of the transmitted signal. The switch-over of the antenna switch 114 takes place in response to the time duration of one measuring procedure. A respective control signal is provided by the control unit 3 at its output 3A connected to the antenna switch 114 as seen in FIG. 1.

A switch-over between the transmitter section 1a and the receiver section 1b of the transmitter receiver unit 1 is performed by the HF-switching unit 12 with its two HF-switches a transmitter-receiver switch 121 and a LO-switch 122, that is, between the transmitting operation and the receiving operation. The transmitter-receiver switch 121 and the LO-switch 122 are set in the left position for the transmitting operation and in the right position for the receiving operation. Feedback control signals responsive to the mean power of the received signals are provided by the control unit 3 at its outputs 3B and 3C for controlling the switching operation of the switches 121 and 122.

HF-radiation is produced by an oscillator 13, constructed for example as a VCO. Additionally the oscillator 13 can be modulated linearly to switch the oscillation frequency in a linear fashion, for example with a switching frequency of 500 kHz, i.e., the carrier frequency of the transmitter pulses can be successively varied within a predetermined frequency band width. Thereby, the carrier frequency is kept constant during a transmitter pulse through a control signal at the output 3D of the control unit 3 connected to the oscillator 13. During the measuring phases of the measuring procedure the switch-over between transmitting operation and receiving operation is performed repeatedly. For example, if the pulse repetition frequency is 500 kHz, the period duration tP of a pulse cycle including the pulse duration tON and the pulse pause is, for example, 2 μs. The pulse width repetition ratio, that is, the ratio between the pulse duration tON and the period duration tP is adjusted to for example 50% at the beginning of the measuring procedure. The receiver section 1b of the transmitter-receiver unit 1 detects as a received signal the reflected signal caused by the latest emitted transmitter pulse, of all reflecting objects prior to the emission of the next transmitter pulse. A mixer 14 provided in the receiver section 1b of the transmitter-receiver unit 1 converts the received signal into a mixed signal in an intermediate frequency band by multiplying the received signal with the oscillator frequency which is constant during a transmitter pulse.

The mixed signal generated by the mixer 14 is amplified by the preamplifier 21 and simultaneously filtered. The preamplifier 21 limits the band width. In order to avoid coupling-in of disturbing signals it is suggested to deactivate the preamplifier 21 through the control unit 3 during the transmitting operation through a control signal from the output 3E of the control unit 3. The amplified and filtered mixed signal is then supplied to the frequency converter 23. The converter 23 converts the amplified and filtered signal with an intermediate frequency into the base band. The intermediate frequency is generated by the local oscillator 24. The mixed signal transformed into the base band is then passed through the anti-aliasing filter 25 to the analog to digital converter 23 which scans the signal and thus digitizes it. The anti-aliasing filter 25 has a limit frequency of about 100 kHz, because frequency shifts between the transmitted signal and the received signal in the use of the system in motor vehicles, are smaller than 100 kHz and are thus in the pass-range of the anti-aliasing filter 25. The output of the filter 25 is connected to an analog to digital converter 26 which provides at its output a digitized mixed signal which is processed by the digital signal processing unit 22 by spectral analysis.

Alternatively, the received signal can be converted into the base band already in the transmitter-receiver unit 1 by the mixer 14. In that case the second frequency conversion by the frequency converter 23 is not necessary and the function of the anti-aliasing filter 25 can be performed by the preamplifier 21 due to its band limiting effect.

The mean power of the received signal is ascertained in the digital signal processing unit 22 on the basis of the amplitude of the digitized mixed signal. A check is being made whether the ascertained value of the mean power of the received signal is larger than a predetermined upper power value or whether it is smaller than a predetermined lower power value. In case the ascertained mean value of the received signal is larger than the predetermined upper power value the mean transmitter power is reduced by reducing the pulse repetition frequency and/or the pulse duration of the transmitted pulses in response to the received signal until the resulting mean power of the transmitted signal is below the predetermined upper power value. On the other hand, if the ascertained value is of the received signal smaller than the lower power value, the mean transmitter power is increased by increasing the pulse repetition frequency and/or the pulse duration of the transmitted pulses in response to the received signal until the resulting mean power of the transmitted signal exceeds the predetermined lower power value. Thus, the mean power of the received signal is adjusted to a value between the predetermined upper and lower power values. This power adjustment of the received signal is performed by either increasing or reducing the transmitted power in response to the received signal as described above.

The relationship between the pulse repetition frequency and the pulse duration and the mean power of the received signal can best be explained with reference to FIGS. 2a to 2c. In these FIGS., the transmitted signal is designated as s, the received signal as r, the pulse duration of a transmitted signal as tON, the period duration as tP and the signal transit time is designated as tRO. As seen for example in FIG. 2a, tON also designates the end of a transmitted pulse. Thereby, only the envelope curves of the transmitted and received signals are shown. The pulse repetition frequency 1/tP is selected, for example as follows: in the time diagram of FIG. 2a it is 500 kHz, in the time diagram of FIG. 2b it is 250 kHz, and in the time diagram of FIG. 2c it is again 500 kHz. In the case of FIGS. 2a and 2b the reflecting object is so close to the radar system that the signal transit time tR0 from the radar system to the reflecting object and back is shorter than the pulse duration of the transmitted signal tON. However, the radar system is capable of receiving reflected pulses only starting with the end of the pulse duration of the transmitted signal tON. Therefore, the area between tRO and tON representing reflected but not received pulses is cut out. The mean power of the received signal r is equal to the surface area under the received pulse referenced to the period duration tP. Therefore, it is possible to directly ascertain from FIGS. 2a to 2c that the mean power of the received signal r in the case of FIGS. 2b and 2c is smaller than in the case of FIG. 2a, i.e. the mean power of the received signal r is reduced by increasing the period duration tP, that is, by reducing the pulse repetition frequency, and by reducing the pulse duration tON of the transmitted signal s.

Due to the relative motion between the reflecting object and the radar system one obtains a frequency shift between the carrier frequency of the transmitted signal s and the carrier frequency of the received signal r as seen in FIG. 3. FIG. 3 shows the frequency spectrum of the received signal r according to FIG. 2a after its conversion into the base band, i.e. of the signal supplied to the anti-aliasing filter 25. The line designated with r0 corresponds to the main line of the received signal r. The position of the line r0 is a measure of the frequency shift between the carrier frequency of the transmitted signal s and of the carrier frequency of the reflected and received signal r. The frequency shift is ascertained by the digital signal processing stage 22. The secondary lines of the received signal r are designated as r1 and r1*. FIG. 3 also shows the frequency range h0 to be evaluated and the pass range h of the anti-aliasing filter 25. The secondary lines r1, r1* are positioned outside of the pass range h and are thus suppressed by the anti-aliasing filter 25. If the pulse repetition frequency is reduced to one half for example from 500 kHz, for reducing the main power of the transmitted signal s, the spacing between the spectral lines r0, r1, and r1* is also reduced to one half. The secondary lines r1, r1* continue to remain, thereby, outside the pass range h and are thus still suppressed by the anti-aliasing filter 25. Additionally, the spectral lines are also reduced in their height which corresponds to the desired reduction of the mean power of the received signal r.

On the other hand, if starting with a transmitted signal s according to FIG. 2a the pulse duration tON of the transmitted pulses is reduced as shown in FIG. 2c, such reduction has no influence on the position of the spectral lines r0, r1, and r1* of the received signal r provided the pulse repetition frequency $tP^{-1}$ remains constant.

Due to the reduction of the signal dynamics it is possible to use analog to digital converters and digital signal processing units which process signals having small bit widths and hence can be produced cost efficiently.

The method according to the invention is not limited to its use in the radar system of FIG. 1. Rather, it is usable in any radar system for motor vehicles, which emits transmitter pulses with a determined carrier frequency, which receives the transmitted and reflected pulses as a received signal, and which limits the band width prior to evaluation. The evaluation of the received signal with regard to the power limitation of the transmitted signal can thereby be performed in the same-signal processing branch in which the range and/or the speed of the reflecting object is ascertained. However, the evaluation can also be performed in a separate circuit section provided especially for the power limitation.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for operating a radar system for ascertaining the information regarding a signal reflecting object present in an observation area of said radar system, said method comprising the following steps:

a) emitting in a timed sequence transmitter pulses with a pulse repetition frequency ($tP^{-1}$) and with a pulse duration (tON) as a transmitted signal (s) into said observation area, b) receiving reflected pulses from said reflecting object, as a received signal (r), c) processing said received signal (r) to produce a control signal representing a received mean power of said received signal (r), d) and varying a transmitting mean power of said transmitted signal (s) in response to said control signal for limiting said received signal (r) to a predetermined power range.

2. The method of claim 1, wherein, in case said mean power of said received signal (r) exceeds an upper power value, said mean power of said transmitted signal (s) is reduced by reducing said pulse repetition frequency ($tP^{-1}$) and/or said pulse duration (tON) of said transmitter pulses until said mean power of said received signal (r) is smaller than or equal to said upper power value.

3. The method of claim 1, wherein, in case said mean power of said received signal (r) falls below a lower power value, said mean power of said transmitted signal (s) is increased by increasing said pulse repetition frequency ($tP^{-1}$) and/or said pulse duration of said transmitter pulses until said mean power of said received signal (r) is larger than or equal to said lower power value.

4. The method of claim 1, further comprising transmitting said, transmitter pulses with a carrier frequency that is constant during said pulse duration (tON).

5. The method of claim 1, further comprising transmitting said transmitter pulses with a carrier frequency and successively varying said carrier frequency from one transmitted pulse to the next transmitted pulse at least during one measuring phase.

* * * * *

UNITED STATES PATENT AND TRADEMARK OFFICE
CERTIFICATE OF CORRECTION

PATENT NO.         : 6,844,842 B2
APPLICATION NO.    : 10/344871
DATED              : January 18, 2005
INVENTOR(S)        : Kroeger et al.

It is certified that error appears in the above-identified patent and that said Letters Patent is hereby corrected as shown below:

<u>Column 6</u>:
     Line 59, after "said", delete ",";

insert a new paragraph at line 66, as follows:
     --6.   The method of claim 1, further comprising evaluating a frequency difference and/or a phase difference between said transmitted signal (s) and said received signal (r) for ascertaining a range and/or a speed of said reflecting object.--.

Signed and Sealed this

Twenty-seventh Day of November, 2007

JON W. DUDAS
*Director of the United States Patent and Trademark Office*